(12) United States Patent
Sheng (10) Patent No.: US 7,032,611 B1
(45) Date of Patent: Apr. 25, 2006

(54) PRESSURE REGULATOR AND METHOD OF USE

(76) Inventor: Xiayang Sheng, 12626 Mesquite Hollow, Sugar Land, TX (US) 77478

( * ) Notice: Subject to any disclaimer, the term of this patent is extended or adjusted under 35 U.S.C. 154(b) by 183 days.

(21) Appl. No.: 10/069,910

(22) PCT Filed: Sep. 1, 2000

(86) PCT No.: PCT/US00/40807

§ 371 (c)(1),
(2), (4) Date: Feb. 28, 2002

(87) PCT Pub. No.: WO01/16513

PCT Pub. Date: Mar. 8, 2001

Related U.S. Application Data (60) Provisional application No. 60/152,096, filed on Sep. 2, 1999.

(51) Int. Cl.
*F16K 15/20* (2006.01)

(52) U.S. Cl. ............... 137/225; 137/505.25; 137/557; 137/559; 152/415

(58) Field of Classification Search ............... 137/102, 137/109, 225, 226, 505.25, 557, 559; 152/415
See application file for complete search history.

(56) References Cited

U.S. PATENT DOCUMENTS

| | | | | |
|---|---|---|---|---|
| 478,480 | A | * 7/1892 | Sweeny | ............... 137/505.25 |
| 1,311,898 | A | * 8/1919 | Jackson | ............... 137/226 |
| 1,504,066 | A | * 8/1924 | Lutes | ............... 137/225 |
| 1,595,809 | A | * 8/1926 | Nichols | ............... 137/225 |
| 1,699,378 | A | * 1/1929 | Smith | ............... 137/226 |
| 1,724,063 | A | * 8/1929 | Anderson | ............... 137/225 |
| 2,987,071 | A | 6/1961 | Haus | |
| 3,450,147 | A | 6/1969 | Webb | |
| 3,586,045 | A | * 6/1971 | Zimmer | ............... 137/505.18 |
| 3,911,988 | A | * 10/1975 | Richards | ............... 137/225 |
| 4,660,590 | A | 4/1987 | Sanchez | |
| 4,788,729 | A | * 12/1988 | Walker | ............... 137/557 |
| 4,869,306 | A | 9/1989 | Keys | |
| 4,883,107 | A | 11/1989 | Keys | |
| 4,895,199 | A | 1/1990 | Magnuson et al. | |
| 4,944,323 | A | 7/1990 | Bartholomew et al. | |
| 4,991,618 | A | * 2/1991 | Gould | ............... 137/225 |
| 5,054,511 | A | 10/1991 | Tuan et al. | |
| 5,365,967 | A | 11/1994 | Moore | |
| 5,398,744 | A | 3/1995 | Street et al. | |
| 5,819,779 | A | 10/1998 | Takemura et al. | |
| 6,142,168 | A | 11/2000 | Sumrall | |

FOREIGN PATENT DOCUMENTS

FR            651280 A       2/1929

\* cited by examiner

*Primary Examiner*—John Rivell (57) ABSTRACT

A pressure regulating device for connecting a pressure source to an inflatable object comprises: a hollow casing; a valve system positioned inside the hollow casing; a fluid inlet connected to the valve system; a fluid outlet; a fluid conduit positioned inside the hollow casing between the fluid inlet and the fluid outlet; a pressure-sensing structure attached to the conduit and being movable inside the hollow casing and attached to the pressure sensing structure; a pressure-generating structure disposed inside the hollow casing and attached to the pressure-sensing structure. The pressure-generating structure can exert a bias force upon the pressure-sensing structure in proportion to a desired pressure in the inflatable object. The pressure regulator can inflate the object when the initial pressure inside the inflatable object is lower than the desired pressure and automatically terminates inflation when the pressure inside the object reaches the desired pressure.

28 Claims, 10 Drawing Sheets

PRESSURE REGULATOR AND METHOD OF USE

PRIOR RELATED APPLICATIONS

This application is a national phase application under 35 U.S.C. 371 which claims priority to international application PCT/US00/40807, filed Sep. 1, 2000 which claims priority to prior filed U.S. Provisional Patent Application Ser. No. 60/152,096, filed Sep. 2, 1999 all of which is incorporated herein by reference in their entirety.

FIELD OF THE INVENTION

The invention relates to a device and method for inflating or deflating an inflatable object, such as a tire.

BACKGROUND OF THE INVENTION

Vehicle tire pressure plays a very important part in tire service life and in vehicle fuel economy. Properly inflated tires may save fuel, reduce pollution, provide a comfortable and safe ride, and last many years of normal driving. Improperly inflated tires may wear out quickly, waste fuel, and can cause collisions. Either over-inflated or under-inflated tires may significantly reduce tire service life. Under-inflated tires often result in reduced vehicle fuel economy.

Most tire inflation methods generally are tedious and involve trial and error. For example, one commonly-used method to achieve a proper tire pressure charge is to utilize an air pressure source and a tire pressure measurement device, charging the tire for a while and then making a measurement, and then charging and making measurement. This procedure is repeated many times to achieve the desired tire pressure. Another tire inflation method, albeit less common, is to regulate down the supply air pressure source to the desired pressure and then to charge the tire with the regulated pressure. Since there is no significant pressure head for the pressure charge, this approach takes much longer time to achieve a desired tire pressure than that of the first method. Due to the tedious nature, neither approach for pressure inflation is very convenient and user-friendly. As a result, vehicle drivers perform a tire pressure check much less often than necessary, and tire inflation becomes an often ignored item of auto maintenance.

For the foregoing reasons, there exists an unfulfilled need for a user-friendly device and method for inflating or deflating an inflatable object, such as a tire. Preferably, such a device and method could automatically inflate or deflate a tire to a desired pressure setting without going through a trial and error process.

SUMMARY OF THE INVENTION

The aforementioned need is fulfilled by embodiments of the invention in one or more of the following aspects. In one aspect, the invention relates to a pressure regulator for connecting a pressure source to an inflatable object. The pressure regulator comprises: (a) a hollow casing having a fluid inlet end, a fluid outlet end, and a side wall; (b) a valve system positioned inside the hollow casing; (c) a fluid inlet connected to the valve system, the inlet located at the fluid inlet end of the hollow casing and adaptable for connection to a pressure source; (d) a fluid outlet located at the fluid outlet end of the hollow casing, the outlet adaptable for connection to an inflatable object; (e) a fluid conduit positioned inside the hollow casing between the fluid inlet and the fluid outlet; (f) a pressure-sensing structure attached to the conduit, the pressure-sensing structure movable inside the hollow casing in the longitudinal direction; and (g) a pressure-generating structure disposed inside the hollow casing and attached to the pressure-sensing structure, the pressure-generating structure capable of exerting a bias force upon the pressure-sensing structure in proportion to a desired pressure in the inflatable object. The pressure regulator is capable of inflating the object when the initial pressure inside the inflatable object is lower than the desired pressure and automatically terminating inflation when the pressure inside the object reaches the desired pressure. Preferably, the pressure-sensing structure (e.g., a piston) is fixedly attached to the conduit. It is also preferred that the pressure-generating structure (e.g., a coil spring) is fixedly attached to the pressure-sensing structure.

Optionally, the pressure regulator is also capable of deflating the object when the initial pressure inside the inflatable object is higher than the desired pressure and automatically terminating deflation when the pressure inside the object reaches the desired pressure. The pressure-sensing structure may be a piston, a bellows, a diaphragm, or any other devices. Suitable pistons include, but are not limited to a lip-type piston or an O-ring piston. The pressure-generating structure may be a coil spring disposed between the pressure-sensing structure and a spring collar. Moreover, the side wall of the hollow casing may include a port (i.e., a bleed aperture) between the pressure-sensing structure and the spring collar, and the port is capable of releasing fluid from the inflatable object when the pressure inside the object exceeds the desired pressure. The distance between the port and the pressure-sensing structure is proportional to the maximum pressure allowed for the inflatable object. The valve system may be a Schrader valve, a ball valve, or any other valves. In some embodiments, the valve system is actuated by the conduit which moves longitudinally with the pressure-sensing structure in response to the pressure differential between the two sides of the pressure-sensing structure. Optionally, the pressure regulator may further include a reed disposed in the fluid flow path. The reed may comprise two sound-generating pieces; the first piece generates a buzzing sound during inflation; and the second piece generates a different buzzing sound during deflation. In other embodiments, the spring collar is connected to at least one screw which extends outside the side wall of the hollow casing. Preferably, the setting for the desired pressure is adjusted by sliding the screw along a longitudinal slot formed in the side wall of the hollow casing. Optionally, a bellows is disposed between the spring collar and the fluid outlet. Preferably, the pressure regulator should include a component for presetting the desired pressure in the inflatable object, such as a pressure marker or any structure which has pressure readings. In some embodiments, the pressure regulator may further include a pressure indicator disposed in the hollow casing. Preferably, the pressure indicator is a marker, which may be attached to the outside of the conduit or other parts of the pressure regulator. Additionally, the pressure regulator may further comprise a flow indicator, and the flow indicator may be a visual ball display or any other display means or devices.

In another aspect, the invention relates to a pressure regulator for connecting a pressure source to an inflatable object. The pressure regulator comprises (a) a hollow casing having a fluid inlet end, a fluid outlet end, and a side wall; (b) means for actuating fluid flow in response to a preset pressure, the means for actuating fluid flow positioned inside the hollow casing; (c) a fluid inlet connected to the valve system, the inlet located at the fluid inlet end of the hollow casing and adaptable for connection to a pressure source; (d) a fluid outlet located at the fluid outlet end of the hollow casing, the outlet adaptable for connection to an inflatable object; (e) fluid passage means positioned inside the hollow casing between the fluid inlet and the fluid outlet; (f) a pressure-sensing means attached to the fluid passage means, the pressure-sensing means movable inside the hollow casing in the longitudinal direction; and (g) a pressure-generating means disposed inside the hollow casing and attached to the pressure-sensing means, the pressure-generating means capable of exerting a bias force upon the pressure-sensing means in proportion to a desired pressure in the inflatable object. The pressure regulator is capable of inflating the object when the initial pressure inside the inflatable object is lower than the desired pressure and automatically terminating inflation when the pressure inside the object reaches the desired pressure.

In still another aspect, the invention relates to any product which incorporates the pressure regulator disclosed herein. For example, the product which can be made from the pressure regulator includes, but is not limited to, a tire valve, a tire valve extension, a flow control device, a tire inflating or deflating device, etc.

In yet another aspect, the invention relates to a method of inflating or deflating an inflatable object which comprises using any of the devices described herein.

In yet still another aspect, the invention relates to a method of inflating or deflating an inflatable object. The method comprises (a) obtaining a pressure regulator comprising a pressure-sensing structure, a pressure-generating structure, a fluid conduit, and a valve system inside a hollow casing, the valve system capable of actuating fluid flow to the fluid conduit according to the difference between a desired pressure and the actual pressure inside the inflatable object; (b) presetting the desired pressure on the regulator to cause the pressure-generating structure to exert a bias force on the pressure-sensing structure, (c) connecting the pressure regulator to a pressure source and the inflatable object; (d) effectuating fluid flow from the pressure source to the inflatable object through the fluid conduit if the desired pressure is higher than the initial pressure in the inflatable object; and (e) effectuating fluid release from the inflatable object and through the fluid conduit if the desired pressure is lower than the initial pressure in the inflatable object.

Additional aspects of the invention and advantages or objects of the invention become apparent with the following description.

DESCRIPTION OF EMBODIMENTS OF THE INVENTION

Embodiments of the invention provide a pressure regulator for automatic inflation and/or deflation. Many new products can be made from this pressure regulator, e.g., a pressure-adjustable automatic tire valve, a tire inflating extension, etc. These devices are user-friendly and provide easy, quick, and accurate tire inflation or deflation. During use, the user only needs to preset the pressure value recommended by the auto manufacturer and connect the inlet of the pressure regulator to a high pressure source (such as an air tank or pump) and the outlet to a tire. The inflation or deflation automatically starts and terminates once the tire pressure reaches the preset value.

Figure 1:
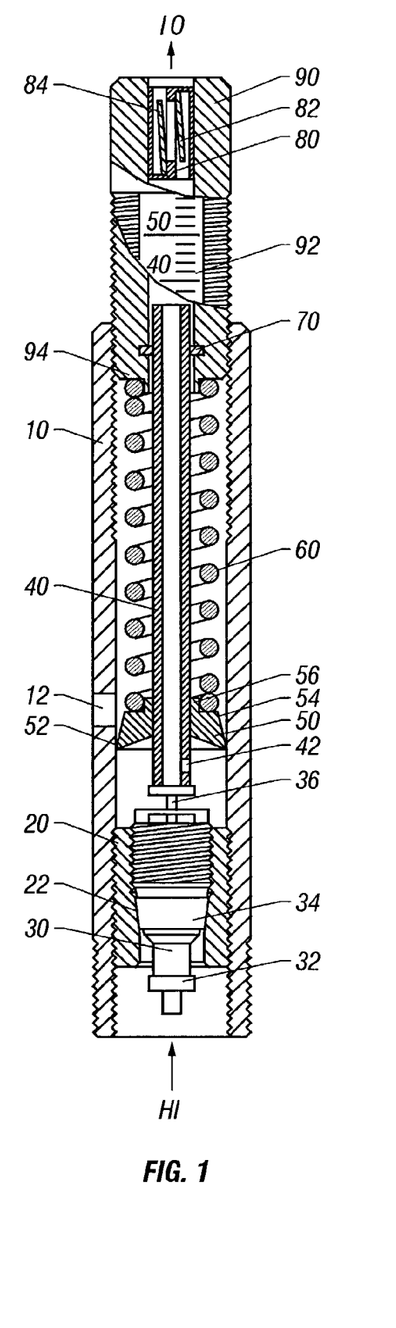
FIG. 1 is a partial cross-sectional view of a pressure regulator in accordance with a first embodiment of the invention.

FIG. 1 shows a pressure regulator in accordance with one embodiment of the invention. It can be used to regulate the flow of fluid from a high pressure source, for example, an air compressor, to a low pressure receiving object, for example, a tire to be inflated. The regulator can inflate or deflate the low pressure receiving object automatically to a predetermined pressure value. In some embodiments, the regulator can also generate an audible buzzing sound during inflation or deflation, which helps the user to identify the inflation or deflation status.

The term "fluid" used herein refers to any material which flows under pressure, including but not limited to, gases, liquids, and semi-solids, and combinations thereof. A preferred fluid is air. "Low pressure receiving object" or "inflatable object" herein refers to any hollow object which is capable of receiving a fluid therein. It includes, but is not limited to, tires, balloons, toys, lifesavers, beach balls, etc. A preferred inflatable object is a tire.

Referring to FIG. 1, the regulator comprises a hollow cylindrical casing 10, an adapter 20, a valve system 30, a tubular conduit 40 for allowing fluid passage from a high pressure source to a low pressure receiving object, a pressure-sensing structure (e.g., a piston) 50, a coil spring 60, a dynamic seal 70, a reed 80 (which is optional), and a hollow shaft 90. Although the conduit is preferably straight, it can take any other shapes, such as curved, helical, etc.

One end of the cylindrical casing 10 is connected to one end of the hollow shaft 90 by threads that allow the shaft 90 to be screwed in or out of the casing 10. While the end of the casing 10 provides a fluid inlet connected to a high pressure source (not shown) designated as "HI," the other end of the shaft 90 provides a fluid outlet to a low pressure receiving object (not shown) designated as "LO."

The valve system 30 (e.g., a standard tire valve core such as a Schrader valve) is placed in the high pressure fluid inlet side of the casing 10 by a threaded adapter 20. The seal portion 34 of the valve system 30 preferably is firmly tightened against the seat 22 inside the adapter 20. Sealing materials, such as polytetrafluroethylene tapes, may be used on the threads between the adapter 20 and the casing 10 to ensure a good seal. Any sealing materials can be used.

The top of the valve stem 36 of the valve system 30 is normally in contact with one end of the conduit 40. The other end of the conduit 40 extends into the low pressure fluid outlet of the shaft 90. A dynamic seal 70, such as an O-ring, supports the conduit 40 and enables the conduit 40 to slide easily through the seal 70 without fluid leak. One or more ports 42 are formed on the side wall of the conduit 40 between the piston 50 and the valve system 30 to allow fluid flow.

The piston 50 in this embodiment is of a lip-type, which comprises an elastic lip 52, a shoulder 54, a stem 56 and a central bore for receiving the conduit 40, although other types, such as an O-ring piston, can also be used. The piston 50 is attached (preferably fixedly attached) to the conduit 40 at the end close to the valve system 30 through the central bore of the piston 50. The lip 52 of the piston 50 is in contact with the inner wall of the casing 10. Preferably, the contact between the lip 52 and the inner wall of the casing 10 is leak-proof.

The coil spring 60 surrounds the conduit 40. One end of the coil spring 60 is seated on the piston shoulder 54 and around the piston stem 56. The other end of the spring 60 is held in contact with the spring collar 94 of the threaded hollow shaft 90.

The threaded hollow shaft 90 is optionally provided with at least one unthreaded portion or side where numerals and scale marks 92 are placed by any marking means, such as embossing or stamping. The marks 92 are calibrated so that when aligned with the end of the casing 10 or some other indicators, the numeral or scale represents the desired pressure in the fluid receiving object after inflation.

A port 12 on the side wall of the casing 10 is disposed between the piston lip 52 and the spring collar 94 for setting an upper limit of the desired pressure (or the maximum allowed pressure) in the fluid receiving object. The distance between the port 12 and the contact point between the inner wall of the casing 10 and the lip 52 determines the desired upper pressure limit.

Optionally, a reed 80 is placed inside the hollow shaft 90 to generate a buzzing sound, indicating that either inflation or deflation is in process. The reed 80 comprises two reed strips 82 and 84 positioned in an opposing relationship along the center line of the shaft 90 so that one reed strip works during inflation, and the other works during deflation. Furthermore, the two reed strips differing from each other in shape, size, weight, or material may generate sound in two different frequencies, so that the user can identify whether inflation or deflation is in progress by the type of the buzzing sound.

The operation of the pressure regulator is relatively simple and straightforward. Once the user presets a desired or predetermined pressure value on the pressure regulator and connects the fluid inlet and outlet of the pressure regulator to a high pressure source and a receiving object, respectively, inflation or deflation proceeds automatically.

Figure 2:
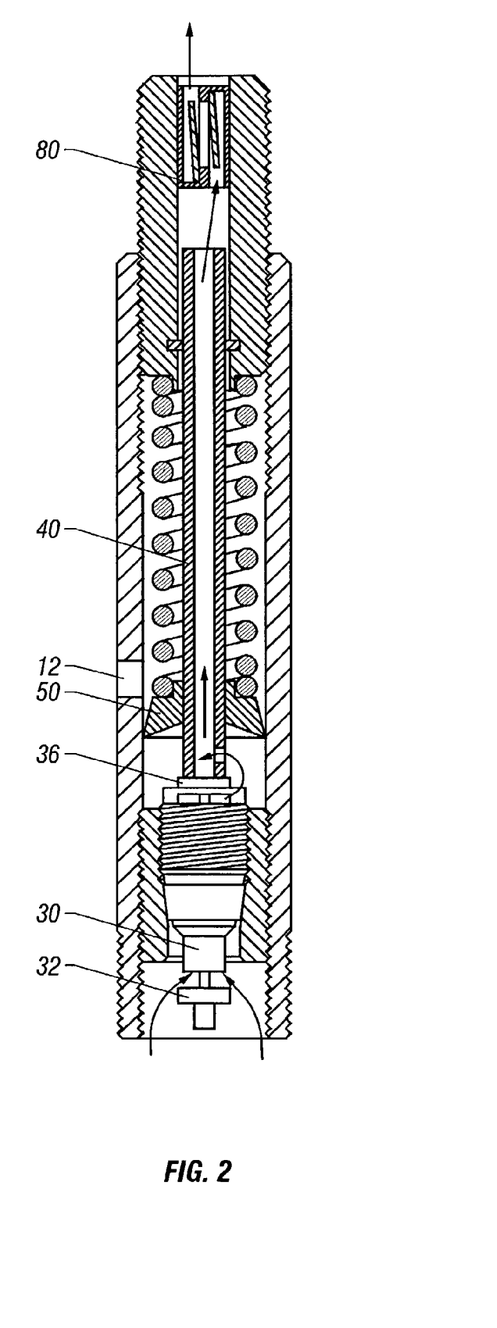
FIG. 2 is a partial cross-sectional view of the pressure regulator of FIG. 1 during inflation.

To preset the desired pressure for a fluid receiving object, the shaft 90 is screwed in or out of the casing 10 until the desired reading of the pressure scale mark 92 is aligned with the upper edge of the casing 10. At this point, the spring 60 is compressed (or expanded) and produces a bias force against the piston 50. The piston 50 then pushes the valve stem 36 down through the conduit 40 and opens up the normally closed valve 32. The regulator in the open state is shown in FIG. 2. When the valve 32 is open, the fluid in the high pressure source flows through the valve system 30, passes through the ports 42, and enters the bore hole of the conduit 40. After exiting the conduit 40, the fluid passes the reed 80 and generates a buzzing sound. After passing the reed 80, the fluid enters the low pressure receiving object (not shown). The flow path of the fluid is indicated by arrows in FIG. 2.

Figure 3:
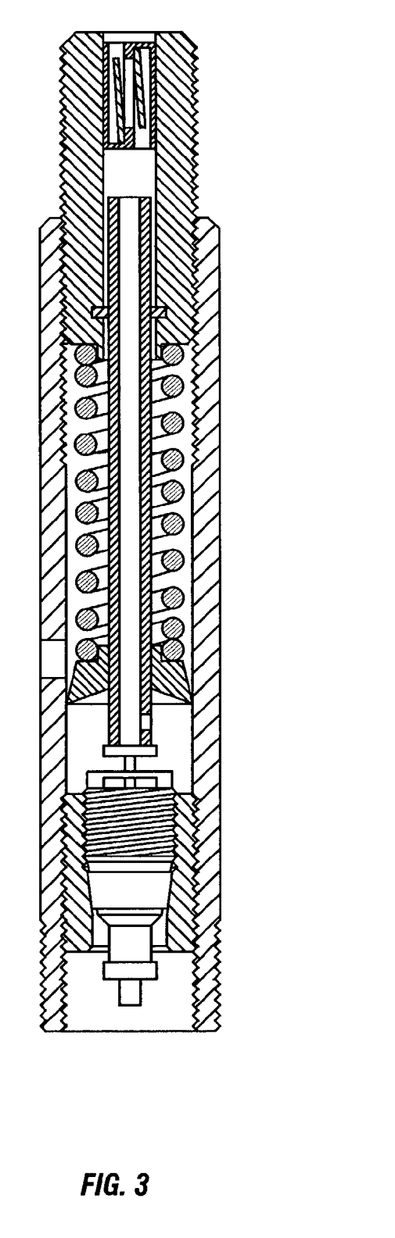
FIG. 3 is a partial cross-sectional view of the pressure regulator of FIG. 1 in a balance position.
Figure 4:
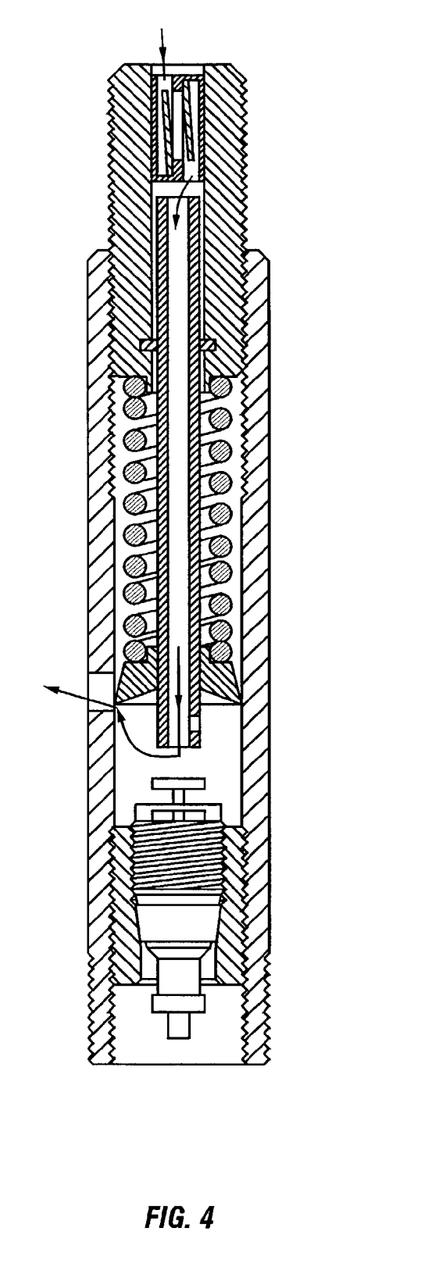
FIG. 4 is a partial cross-sectional view of the pressure regulator of FIG. 1 during deflation.

When the inlet end of the casing 10 is connected to a high pressure fluid source, and the outlet end of the shaft 90 is connected to a low pressure fluid receiving object, three scenarios can happen as shown in FIGS. 2, 3 and 4, depending on the initial pressure in the fluid receiving object.

If the pressure in the receiving object is lower than the preset value on the pressure regulator, inflation begins. The fluid flows from the high pressure source into the low pressure receiving object through the valve system 30, the conduit 40 and the reed 80 as shown in FIG. 2. The passing fluid blows the reed 80, generating a buzzing sound. As the pressure in the receiving object approaches the predetermined pressure value, the piston 50 is gradually forced to move away from the valve stem 36. Consequently, the valve 32 gradually returns to its normally closed position and eventually terminates the inflation process as shown in FIG. 3. The reed 80 stops buzzing when the fluid flow is terminated.

If the pressure in the receiving object is initially higher than the preset value but lower than the maximum allowed pressure, the regulator is not actuated and the piston 50 is in a balance position as shown in FIG. 3. No sound is generated from the reed 80.

If the pressure in the receiving object is initially higher than the maximum allowed pressure, the piston 50 moves away from the valve stem 36 and further passes the port 12 on the side wall of the casing 10, which permits the deflation of the receiving object. The fluid from the receiving object flows outside the casing 10 through the reed 80, the conduit 40, and the port 12 as shown in FIG. 4. The reed 80 generates a different buzzing sound. When the pressure in the receiving object falls below the maximum allowed value, the piston 50 returns to the balance position, and the deflation process is terminated. The buzzing also stops.

Figure 5:
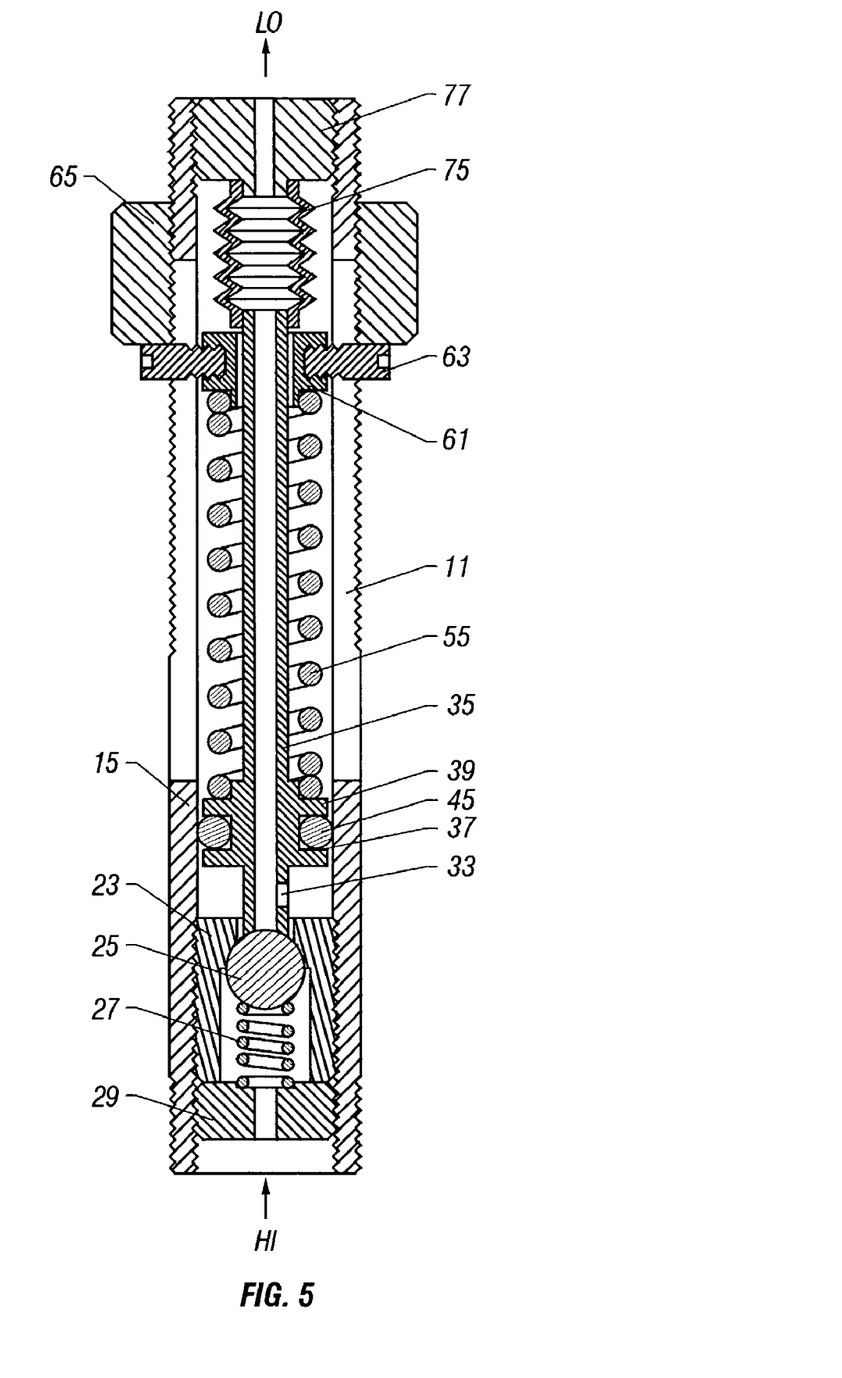
FIG. 5 is a cross-sectional view of a pressure regulator in accordance with a second embodiment of the invention.
Figures 6, 7:
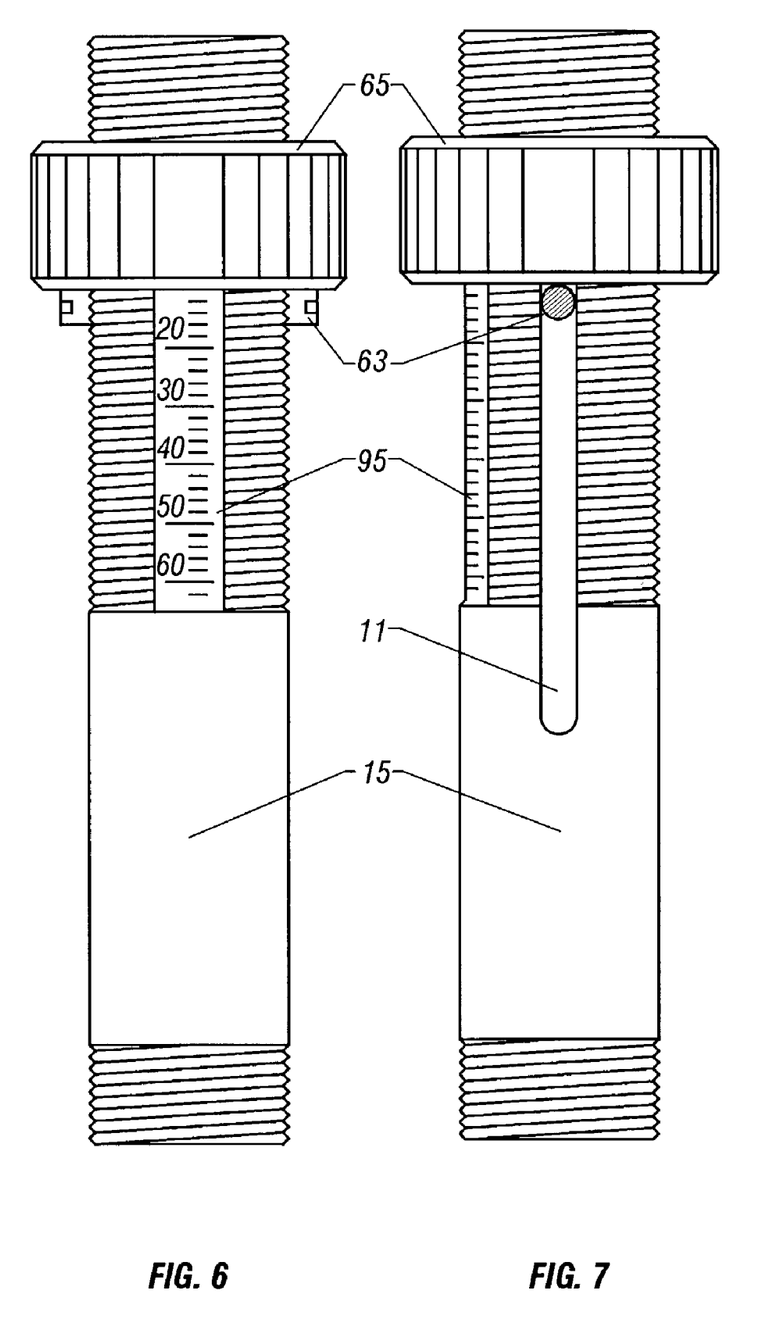
FIG. 6 is a front elevation of the pressure regulator of FIG. 5.
FIG. 7 is a side elevation of the pressure regulator of FIG. 5.

FIGS. 5–7 show another embodiment of the pressure regulator. It has similar configurations, mechanisms, and substantially the same functions, but utilizes a different valve system, different piston, different dynamic seal, different spring compression mechanism and different pressure indicator.

Referring to FIGS. 5–7, the second embodiment of the pressure regulator comprises a hollow cylindrical casing 15, a ball valve seat 23, a ball valve 25, a ball valve spring 27, a ball valve spring support 29, a conduit 35, a pressure-sensing structure (e.g., an O-ring piston) 45, a spring 55, a spring collar 61, two screws 63, a nut 65, a bellows 75, and a pressure indicator 95.

The hollow cylindrical casing 15 has at least one slot 11 (preferably two slots) on the side wall of the casing 15 in the longitudinal direction (i.e., the lengthwise direction of the hollow casing 15). The casing 15 also has numerical pressure marks 95 on the side wall. The casing 15 further includes inside and outside threads at both ends. One end of the casing 15 provides a fluid inlet from a high pressure source (not shown) designated as "HI," and the other end of the casing 15 provides a fluid outlet to a low pressure receiving object (not shown) designated as "LO."

A valve system is provided by the ball valve seat 23, the ball valve 25, the ball valve spring 27, and the ball valve spring support 29. The seat 23 has a center bore and is placed into the fluid inlet of the casing 15 through a plurality of threads. The ball 25, due to the compression of the spring 27, normally closes the center bore of the seat 23. The ball spring support 29 is screwed into the fluid inlet of the casing 15 to control the compression of the spring 27. The support 29 has a hole to allow the fluid in the high pressure source to flow into the valve system.

One end of the conduit 35 normally contacts the top of the ball 25 through the center bore of the valve seat 23. The diameter of the center bore of the seat 23 preferably is larger than the outside diameter of the conduit 35. The other end of the conduit 35 is connected to one end of the bellows 75. Another end of the bellows is connected to an adapter 77 in the fluid outlet of the casing 15. An O-ring piston 45 is placed inside the casing 15 at a location close to the ball valve 25. The O-ring 45 is positioned in a piston groove 37 and in contact with the inner wall of the casing 15, which allows the piston to slide without fluid leak. At least one port 33 is formed on the side wall of the conduit 35 between the O-ring 45 and the ball 25 to facilitate fluid flow.

The spring 55 surrounds the conduit 35. One end of the spring 55 is seated on the piston shoulder 39 while the other end is held in contact with the spring collar 61. One or more screws 63 are radially screwed into the spring collar 61 through a slot 11 (which may be two or more slots) on the side wall of the casing 15. The screws 63 are long enough to extend out of the casing 15, with their side faces contacting the bottom of the nut 65. The nut 65 has inner threads and can move along the outside threads of the casing 15 as the nut 65 turns.

The casing 15 has at least one unthreaded portion (or side) where a pressure scale 95 is marked numerically. The scale 95 is calibrated so that when aligned with the end of the nut 65 or other pressure indicators, the number on the scale represents the desired pressure value in the fluid receiving object after inflation.

The slot 11 on the side wall of the casing 15 is used to set the upper limit of the desired pressure or the maximum allowed pressure in the fluid receiving object. The distance from the O-ring 45 to the bottom edge of the slot 11 represents the upper pressure limit.

To preset the desired pressure for the fluid receiving object, the nut 65 is turned up or down along the threaded casing 15 until the desired reading of the pressure mark 95 is aligned with the lower edge of the nut 65. The nut 65 forces the screws 63 to slide along the slot 11 on the side wall of the casing 15. The spring collar 61 connected to the screws 63 then compresses the spring 55 and produces a bias force against the piston shoulder 39. The conduit 35 with the piston pushes the ball 25 down and opens up the normally closed ball valve.

When the fluid inlet and fluid outlet of the casing 15 are connected to a high pressure fluid source and a fluid receiving object, respectively, three scenarios can occur similar to those shown in FIGS. 2, 3 and 4, depending on the initial pressure in the fluid receiving object.

If the pressure in the receiving object is lower than the desired value, inflation begins. The fluid flows from the high pressure source into the low pressure receiving object through the ball valve spring support 29, the ball valve seat 23, the conduit 35, the bellows 75, and the adapter 77. As the pressure in the receiving object approaches the predetermined pressure value, the piston 45 is gradually forced to move away from the top of the ball 25. Meanwhile, the valve spring 27 pushes the ball 25 back to the original close position and eventually terminates the inflation process.

If the pressure in the receiving object is initially higher than the preset value but lower than the maximum allowed pressure, the regulator is not actuated.

If the initial pressure in the receiving object is higher than maximum allowed pressure, the O-ring 45 moves away from the top of the ball 25 and passes the bottom edge of the slot 11, permitting deflation of the receiving object. The fluid from the receiving object flows into the atmosphere through the adapter 77, the bellows 75, the conduit 35, and the slot 11. When the pressure in the receiving object falls below the maximum allowed pressure, the O-ring 45 returns to its balance position, and the deflation process terminates.

Figure 8:
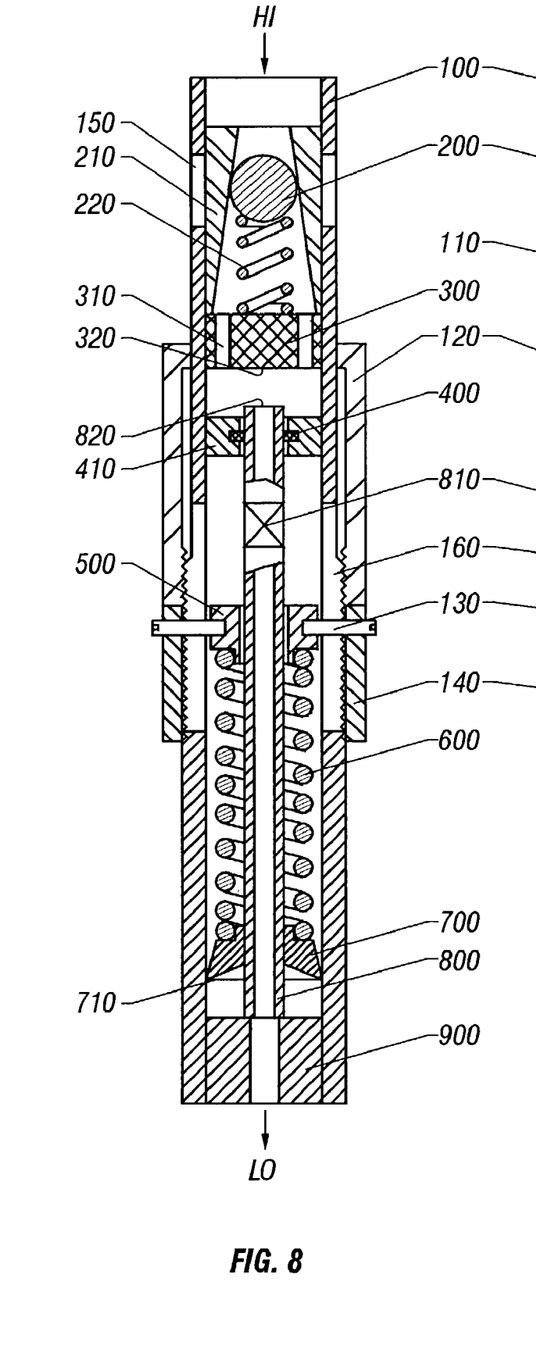
FIG. 8 is a partial cross-sectional view of a pressure regulator in accordance with a third embodiment of the invention.
Figure 9:
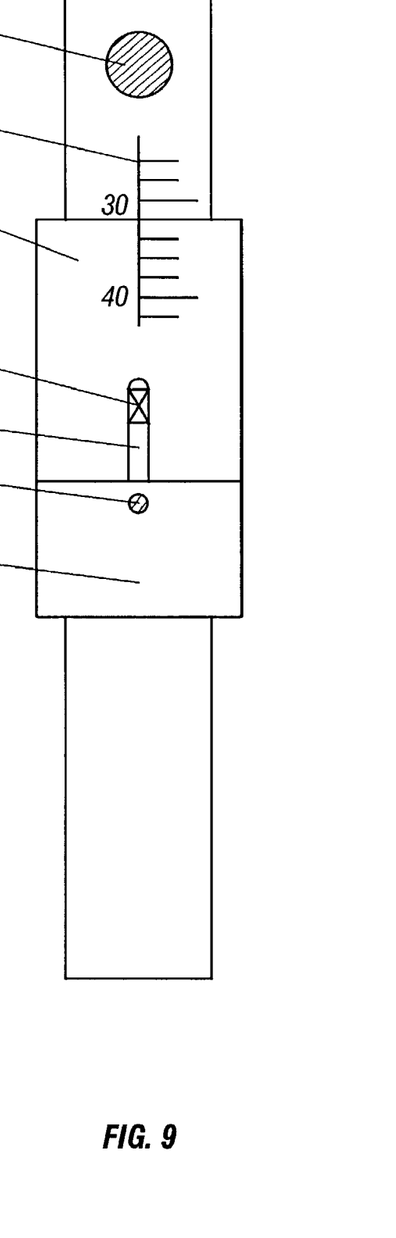
FIG. 9 is a side elevation of the pressure regulator of FIG. 8.

FIGS. 8 and 9 show another embodiment of the invention, which is modified from the first embodiment of FIG. 1. First, the audible reed 80 of FIG. 1 is replaced by a visible ball display 200 in this embodiment, which is suited for use in a noisy environment. Second, the valve core 30 of FIG. 1 is replaced by the rubber stopper 300 in this embodiment and the piston system is turned upside down. With this design, the regulator may lose its deflating function, but its valve system is simplified as a piece of rubber stopper. An advantage of this rubber stopper is that it is fixed to the inner wall of the casing 100 and is not affected by fluid pressure.

The pressure regulator as shown in FIGS. 8 and 9 comprises a hollow cylindrical casing 100, a ball display 200, a rubber stopper 300, an O-ring 400, a spring collar 500, a coil spring 600, a pressure-sensing structure (e.g., a piston) 700, a tubular conduit 800, a supporter 900, two screws 130, a screw holder 140, a pressure adjuster 120, a piece of sight glass 210, a coil spring 220, and an O-ring holder 410.

One end of the cylindrical casing 100 includes a fluid inlet for connection to a high pressure source (not shown) designated as "HI," the other end includes a fluid outlet to a low pressure receiving object (not shown) designated as "LO." At least one port 150 is formed on the side wall of the casing 100 close to the inlet end. The port 150 is sealed with transparent sight glass 210 in the cylindrical casing 100. The sight glass 210 is a hollow cylinder which allows fluid to pass through. The inner wall of the sight glass 210 preferably is tapered. The tapered end faces the fluid inlet. A color ball 200 is located in the sight glass 210 and held by a spring 220. The rubber stopper 300 supports the spring 220. The rubber stopper 300 is fixed to the inner wall of the casing 100 and has at least one bore 310 allowing fluid to pass through. The ball 200 can be any color, including but not limited to black, white, red, yellow, blue, pink, green, etc.

One end of the tubular conduit 800 is beneath the rubber stopper 300, and the other end sits on the supporter 900. The supporter 900 has at least one bore to allow the fluid to flow through, and it is fixed to the inner wall of the casing 100. The O-ring 400 dynamically seals the outer wall of the conduit 800. An O-ring holder 410 holds the O-ring 400. The O-ring holder preferably is tightly bonded to the inner wall of the casing 100 so that no fluid can pass through it. A color mark 810 is placed outside the conduit 800 and is aligned with a slot 160 of the casing 100. The mark 810 indicates the relative position of the piston 700. The piston 700 is attached to the other end of the tubular conduit 800, and its lip 710 contacts the inner wall of the casing 100 to form a dynamic seal.

One end of the coil spring 600 sits on the piston 700, and the other end is held by the spring collar 500. One or more screws 130 are connected to the spring collar 500 and extend out of one or more slots 160. The screw 130 is fixed to the screw holder 140. The hollow screw holder 140 covers the lower part of the slots 160 and can move up or down along the casing 100 by a pressure adjuster 120. One end of the pressure adjuster 120 is connected to the outer wall of the casing 100 through a plurality of threads, while the other end can slide over the casing 100 and align with the pressure scale mark 110 on the outer wall of the casing 100. The transparent pressure adjuster 120 covers the upper part of the slot 160 and allows the piston position mark 810 to be seen. Both the screw holder 140 and the pressure adjuster 120 can also protect the slots 160 from dust.

To preset the pressure for the fluid receiving object, the pressure adjuster 120 is turned up or down along the casing 100 until a desired reading of the pressure mark 110 is aligned with the top edge of the pressure adjuster 120. The pressure adjuster 120 forces the screw holder 140 with the screws 130 to slide along the slots 160 on the side wall of the casing 100. The spring collar 500 connected to the screws 130 then compresses the spring 600 and produces a bias force against the piston 700.

Figure 10:
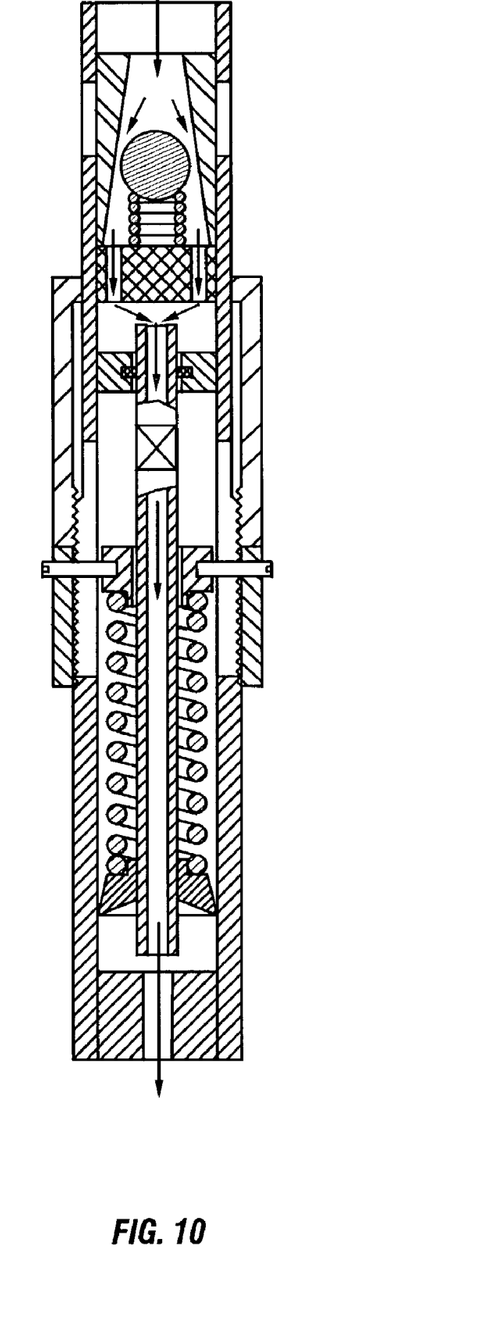
FIG. 10 is a partial cross-sectional view of the pressure regulator of FIG. 8 during inflation.
Figure 11:
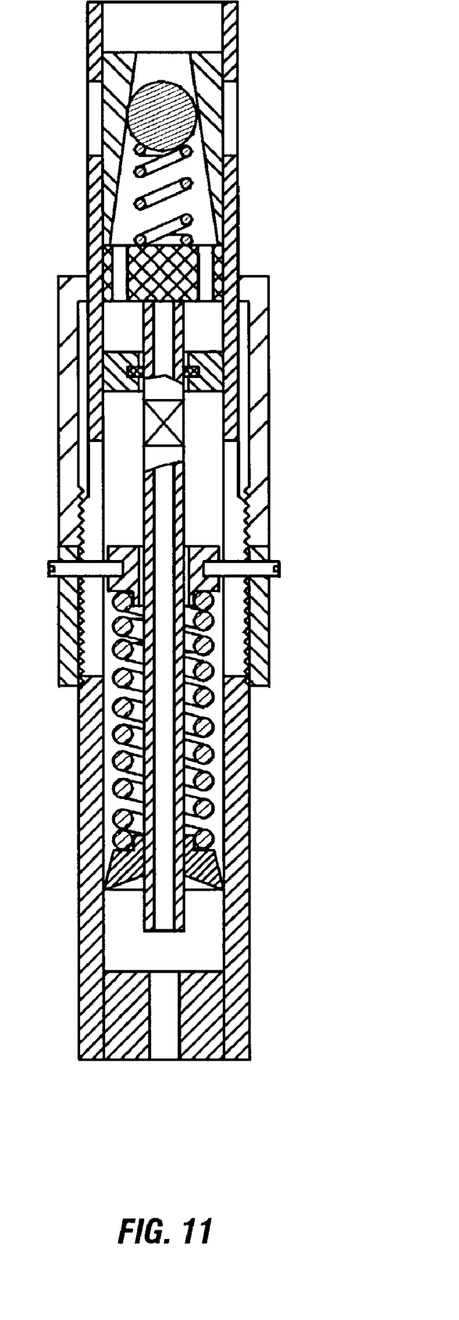
FIG. 11 is a partial cross-sectional view of the pressure regulator of FIG. 8 after inflation.

When the fluid inlet and fluid outlet of the casing 100 are connected to a high pressure fluid source and a fluid receiving object, respectively, inflation begins if the pressure in the receiving object is lower than the desired value. As shown in FIG. 10, the fluid flows from the high pressure source into the low pressure receiving object through the ball display system 200, the hole 310 in the rubber stopper 300, the tubular conduit 800, and the hole of the supporter 900. The flowing fluid pushes the ball 200 downward and indicates the ongoing inflating status. When the pressure in the receiving object reaches the predetermined pressure value, the piston 700 is forced to move away from the top of the supporter 900. Meanwhile, the piston 700 pushes the upper end 820 of the tubular conduit 800 onto the bottom 320 of the rubber stopper 300, and the inflation process terminates. Since no fluid exerts force on the ball 200, the spring 220 pushes the ball 200 back to its original position as shown in FIG. 11. The user can observe the position of the ball 200 through the port 150 and the sight glass 210 to determine the status of the inflation process.

If the pressure in the receiving object is initially equal to or higher than the preset value, the regulator is not actuated, and the ball 200 remains at the original position as shown in FIG. 11.

While the position of the ball 200 is a function of the fluid current, the position of the mark 810 is a function of the pressure in the receiving object. When the pressure in the receiving object is equal to or higher than the preset value, the mark 810 moves up and can not be seen through the slots 160. When the pressure in the receiving object is lower than the preset value, the mark 810 moves down and can be seen through the slot 160. If the mark 810 is graduated with pressure readings (e.g., the scale mark 110 of FIG. 9), one can determine the exact pressure in the receiving object. Therefore, the mark 810 may act as a pressure gauge. This feature is useful in some applications, such as the tire valves as exemplified in FIGS. 16–19 (to be discussed later). In this embodiment, the pressure mark 110 is for presetting the desired pressure in an inflatable object; whereas the mark 810 is a pressure gauge which measures the actual pressure in the inflatable object.

Figure 12:
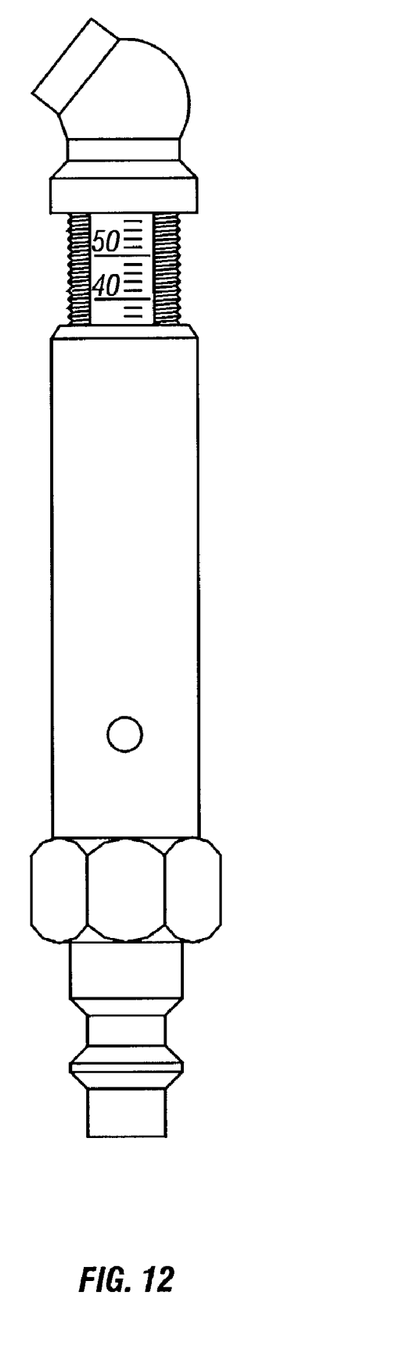
FIG. 12 is an elevation of an automatic inflating and deflating device with a built-in pressure regulator in accordance with an embodiment of the invention.

The potential applications of the pressure regulator are numerous. For example, when combined with a suitable connector, the pressure regulator in accordance with embodiments of the invention can be utilized in any flow control process in which a fluid flows from a relatively higher pressure source to a relatively lower pressure receiving object. FIG. 12 exemplifies one application in which an automatic inflating and deflating device is built by the combination of the pressure regulator of FIG. 1 with a standard tire valve chuck and a quick air hose connector. This automatic inflating and deflating device can be used in auto repair shops, at gas stations, or in any other situations where either inflation or deflation is desired.

Figure 13:
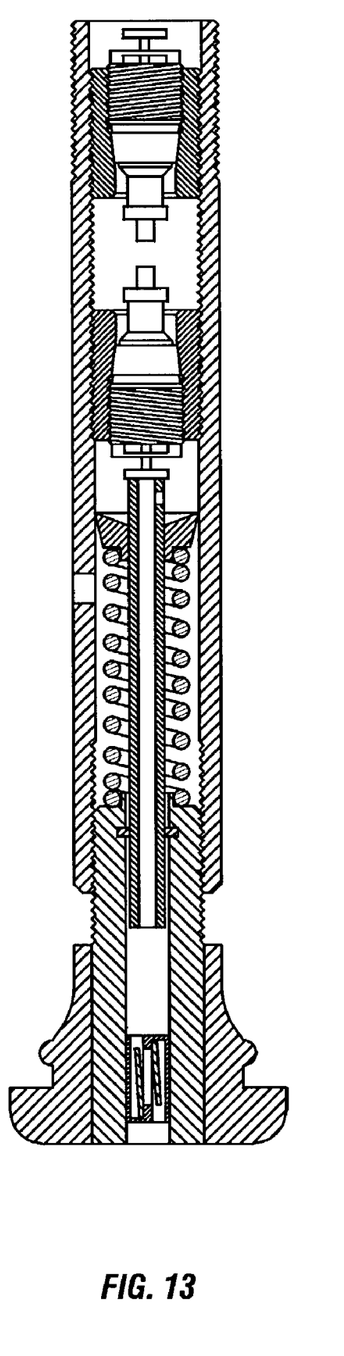
FIG. 13 is a partial cross-sectional view of an adjustable pressure tire valve assembly with a built-in pressure regulator of FIG. 1.

FIG. 13 shows another application in which the pressure regulator of FIG. 1 is built in a conventional tire valve. This new tire valve can be used in the same manner as the conventional tire valve, but the new tire valve has more functions. When the new tire valve is used on a tire, the tire pressure can easily be adjusted. The tire pressure can be preset by the new valve so that the tire inflation can automatically be terminated once the preset pressure is reached. Thus, the risk of over-inflation is substantially reduced. The maximum allowed tire pressure can also be preset with the new valve so that the valve may automatically deflate the tire to a safe pressure range in the case of overloading, hot weather, severe road conditions, or other cases when the tire pressure increases unexpectedly.

Figures 14, 15:
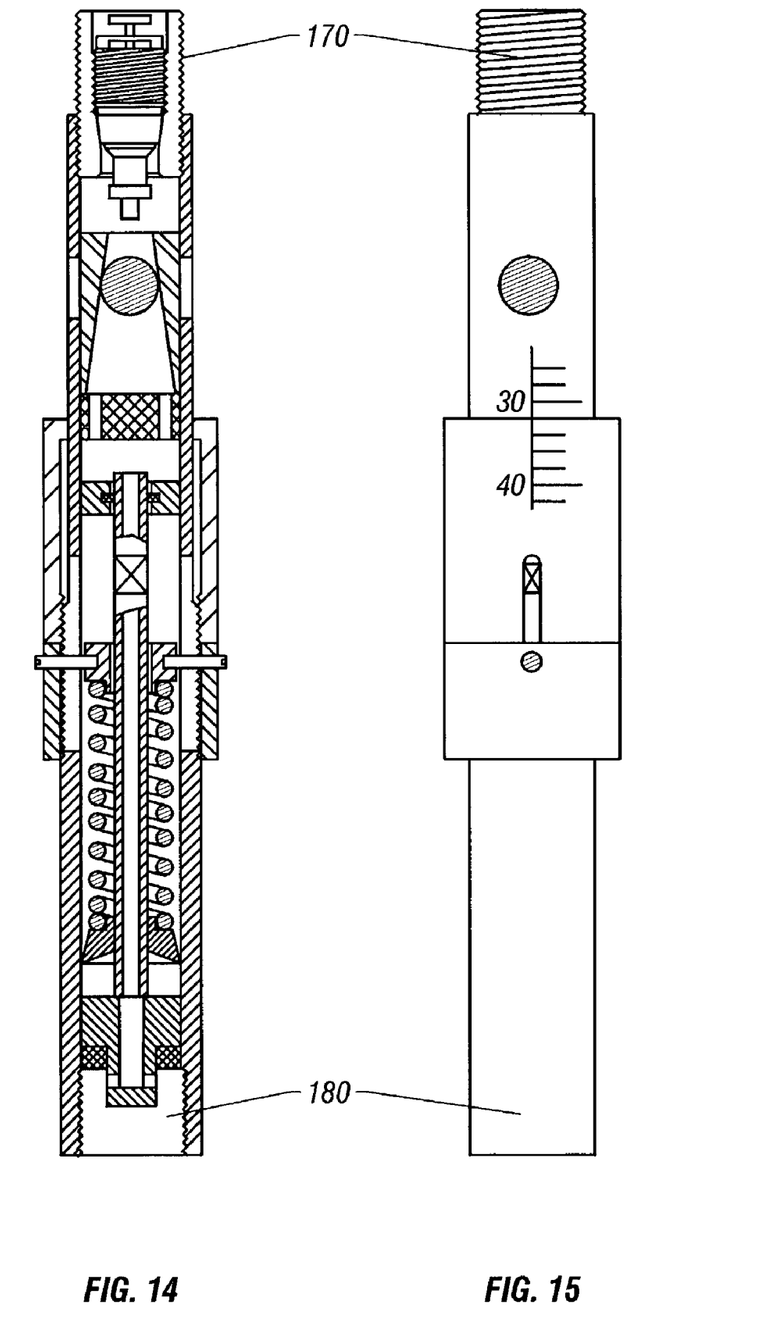
FIG. 14 is a partial cross-sectional view of an adjustable pressure tire valve extension assembly with a built-in pressure regulator of FIG. 8.
FIG. 15 is a side elevation of the tire valve extension of FIG. 14.

FIGS. 14 and 15 show still another application of the pressure regulator in accordance with embodiments of the invention: the pressure regulator of FIG. 8 or FIG. 9 is combined with a standard tire valve head 170 and a tire valve chuck 180 to form a tire valve extension. To use the tire valve extension, the user needs to preset the pressure value, screw the extension on the tire valve, and press the air chuck on the extension head. Then, inflation automatically starts. This tire valve extension can be used for any tire inflation. It is especially useful when the tire valve is hard to reach by conventional inflating devices. For example, many vehicles have wheel covers which must be removed to attach an air chuck to the tire valves. However, the tire valve extension according to embodiments of the invention can be attached to the tire valves directly without removing the wheel covers.

Figure 16:
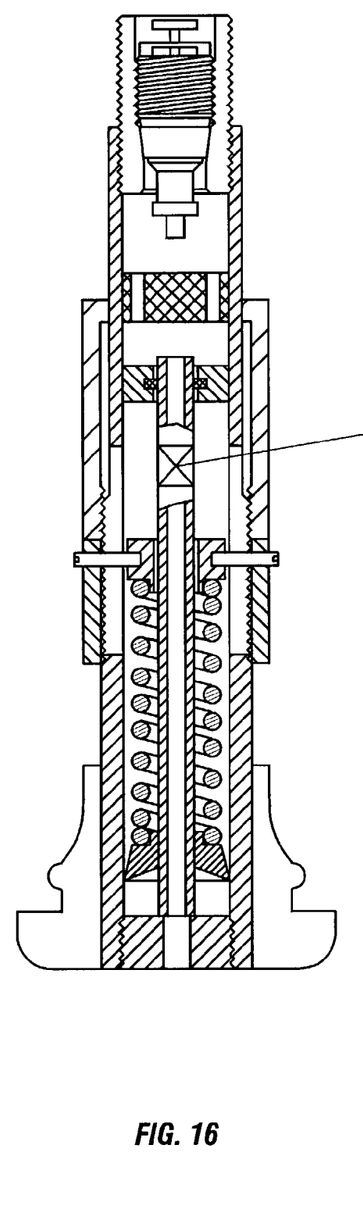
FIG. 16 is a partial cross-sectional view of an adjustable pressure tire valve assembly with a built-in pressure regulator of FIG. 8 without a ball display.
Figure 17:
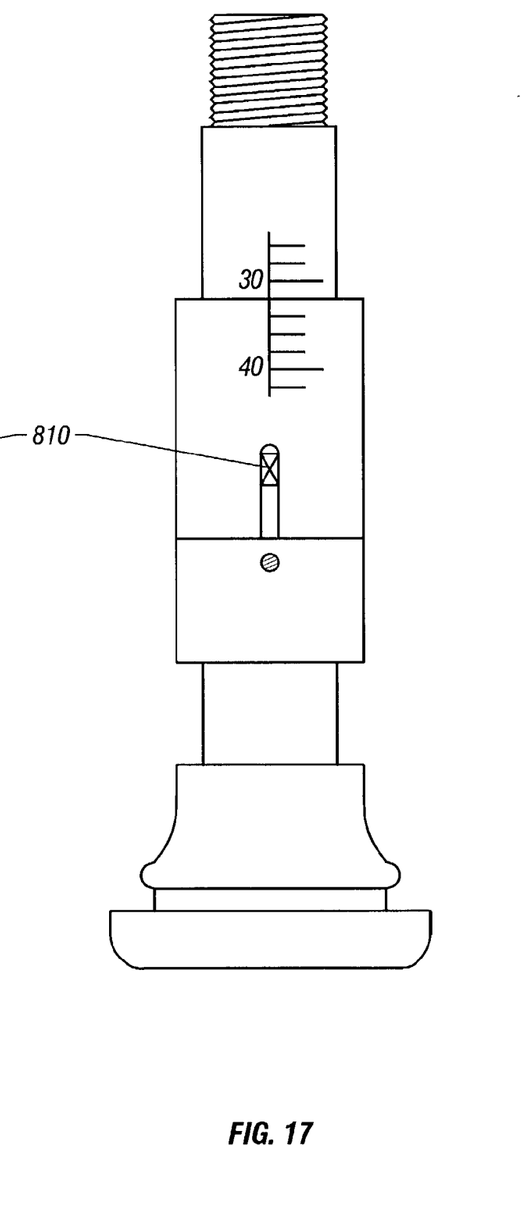
FIG. 17 is a side elevation of the tire valve of FIG. 16.

Yet another application which is a new tire valve is shown in FIGS. 16 and 17. The tire valve is a combination of a conventional tire valve and the pressure regulator of FIG. 8 or FIG. 9, but the visual ball display system is removed to make the tire valve simpler and more reliable. This new tire valve can be used like a conventional tire valve, but the tire pressure can be preset and adjusted. When the new tire valve is used on a tire, the tire inflation may automatically be terminated once the predetermined pressure is reached, and the tire is not likely to be over-inflated. A mark 810 acts as a pressure gauge, indicating the tire pressure. If the mark can be seen, the tire pressure is lower than the preset pressure, and inflation is needed. When inflation is completed, the tire pressure reaches the preset pressure, and the mark cannot be seen. Therefore, this mark is an indicator as to whether the tire pressure is proper or low. If the mark is graduated with pressure readings, it can indicate the exact pressure in the tire.

As described above, the pressure regulator in accordance with embodiments of the invention provides a versatile, convenient, reliable compact device that can be mass-produced in a cost-effective manner. It can be used in any flow control process in which a fluid flows from a relatively higher pressure source to a relatively lower pressure receiving object.

Figure 18:
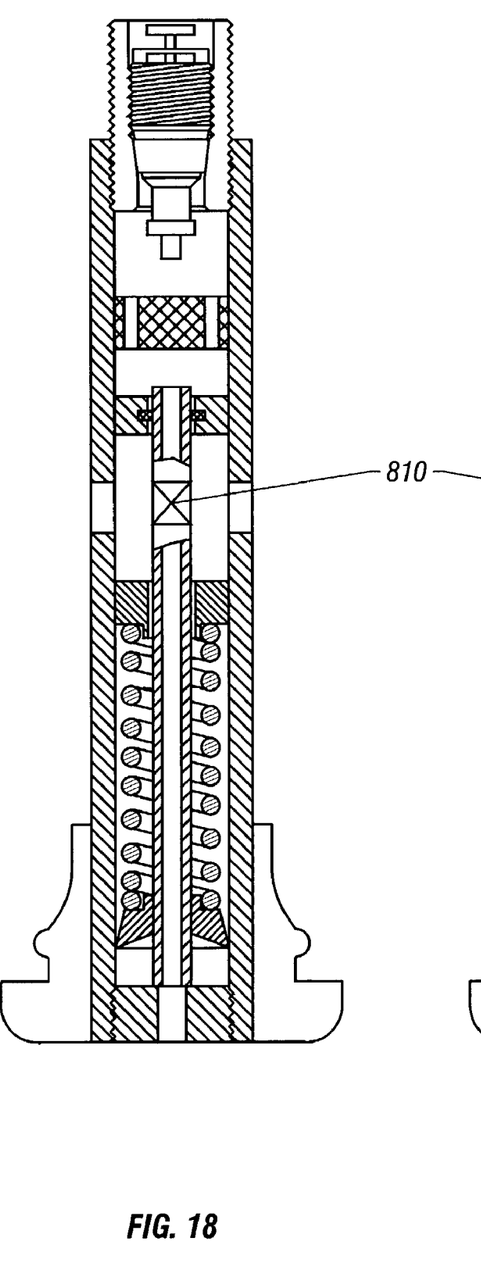
FIG. 18 is a partial cross-sectional view of a fixed pressure tire valve assembly with a built-in pressure regulator of FIG. 8 without a ball display.
Figure 19:
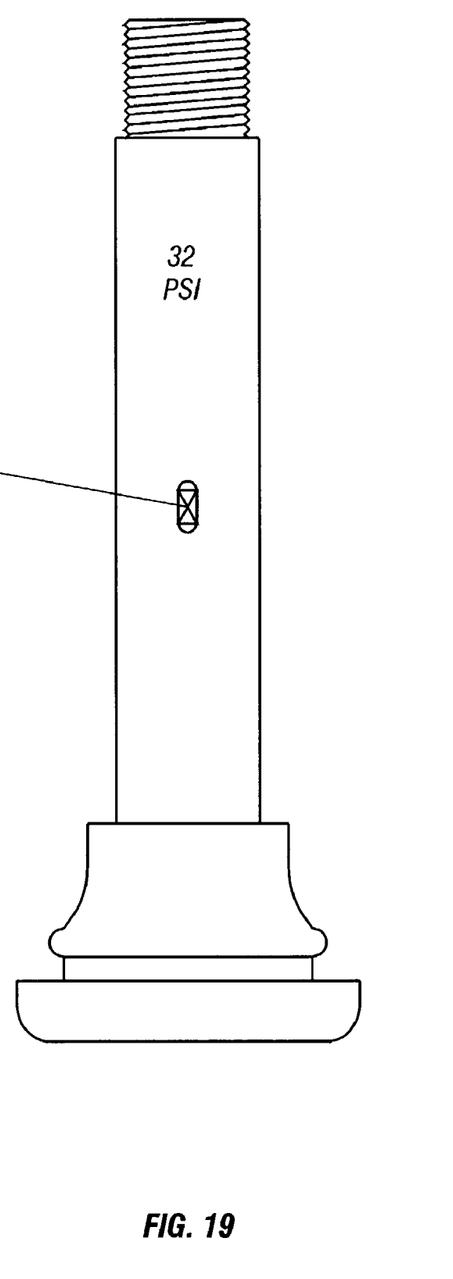
FIG. 19 is a side elevation of the tire valve assembly of FIG. 18.

It should be recognized that each of the components described above can be substituted by its functional equivalents or structural equivalents. For example, the pressure-sensing structure encompasses any device or structure which moves in response to pressure differential. It includes, but is not limited to, pistons, diaphragms, bellows, etc. Any type of pistons can be used. Although an adjustable spring compression mechanism is used in all the examples of this invention as mentioned above, a fixed spring compression mechanism can also be used if necessary. For instance, many cars require only one tire pressure value, such as 32 psi. In this case, the spring adjuster of the new tire valve of FIGS. 16 and 17 is not needed, and the spring collar can be fixed on the inner wall of the casing where a 32 psi pressure is generated as shown in FIGS. 18 and 19. This would further simplify the new tire valve.

In addition, the spring compression mechanism can be achieved by a screw, a pin, friction or other fixing methods. The coil springs can be replaced by any other springs, such as Belleville springs, gas springs, and polymer springs. Any other style valves can also be used in addition to a standard tire valve, a ball valve and a rubber stopper as mentioned above. The audible reed or the visible ball display may be replaced by any other display or warning indicators to indicate the fluid flow status if needed.

Functional equivalents that can be used in embodiments of the invention to replace one or more components are those which perform substantially the same function; but they need not perform the function in substantially the same way and achieve substantially the same result. A functional equivalent may have a different structure. On the other hand, structural equivalents that can be used in embodiments of the invention to replace one or more components are those which has similar structures but may perform more functions or less functions. Suitable functional equivalents or structural equivalents include both known and unknown equivalents. Following U.S. patents disclose various parts or components which may be used to replaced or be combined with one or more components in embodiments of the invention: U.S. Pat. Nos. 6,067,850; 5,878,774; 5,857,481; 5,855,281; 5,819,780; 5,819,779; 5,816,284; 5,780,734; 5,778,923; 5,694,969; 5,628,350; 5,398,744; 5,365,967; 5,309,969; 5,295,504; 5,293,919; 5,181,977; 5,159,961; 5,135,023; 5,094,263; 5,054,511; 5,029,604; 4,991,618; 4,944,323; 4,922,946; 4,901,747; 4,895,199; 4,884,593; 4,883,107; 4,869,306; 4,768,564; 4,768,460; 4,708,169; 4,681,148; 4,660,590; 4,658,869; 4,598,750; 4,489,855; 4,474,207; 4,464,929; 4,462,449; 4,445,527; 4,340,080; 4,310,014; 4,244,214; 4,153,096; 4,126,161; 4,120,614; 4,117,281; 4,076,037; 3,994,312; 3,911,988; 3,910,305; 3,830,249; 3,789,867; 3,739,637; 3,537,469; 3,491,786; 3,450,147; 3,426,787; Re. 29,1919; 1,246,131. In addition, PCT Application WO 00/25051 (which claims priority to U.S. provisional application No. 60/105,471, filed on Oct. 23, 1998) also discloses various components that can be used in embodiments of the invention. All of the preceding patents and publication are incorporated herein by reference in their entirety.

While the invention has been described with respect to a limited number of embodiments, variations and modifications therefrom exist. For example, although a preferred pressure regulator should have both inflation and deflation functions, a pressure regulator which only inflates or deflates is still within the scope of the invention. It is possible to combined one or more components in some embodiments to make the devices more compact. For some applications, it may be desirable to incorporate a pressure sensor or a microprocessor into the devices described herein. The inflating or deflating methods are described with respect to a number of steps. These steps can be practiced in any order or sequence. One or more steps may also be practiced simultaneously. The appended claims intend to encompass all such variations and modifications as falling within the scope of the invention.

What is claimed is:

1. A pressure regulator for connecting a pressure source to an inflatable object, comprising:
   a hollow casing having a fluid inlet end, a fluid outlet end, and a side wall;
   a valve system positioned inside the hollow casing;
   a fluid inlet connected to the valve system, the inlet located at the fluid inlet end of the hollow casing and adaptable for connection to a pressure source;
   a fluid outlet located at the fluid outlet end of the hollow casing, the outlet adaptable for connection to an inflatable object;
   a fluid conduit positioned inside the hollow casing between the fluid inlet and the fluid outlet;
   a pressure-sensing structure attached to the conduit, the pressure-sensing structure movable inside the hollow casing in the longitudinal direction; and
   a pressure-generating structure disposed inside the hollow casing and attached to the pressure-sensing structure, the pressure-generating structure capable of exerting a bias force upon the pressure-sensing structure in proportion to a desired pressure in the inflatable object;
   wherein the valve system is actuated by the conduit which moves longitudinally with the pressure-sensing structure in response to the pressure differential between the two sides of the pressure-sensing structure, capable of preventing the force produced by the pressure source from transferring to the pressure-sensing structure when the valve system is in close state;
   wherein the pressure regulator is capable of inflating the object when the initial pressure inside the inflatable object is lower than the desired pressure, and the pressure regulator is capable of automatically terminating inflation when the pressure inside the object reaches the desired pressure.

2. The pressure regulator of claim 1, wherein the pressure regulator is capable of deflating the object when the initial pressure inside the inflatable object is higher than the desired pressure, and the pressure regulator is capable of automatically terminating deflation when the pressure inside the object reaches the desired pressure.

3. The pressure regulator of claim 1, wherein the pressure-sensing structure is a piston.

4. The pressure regulator of claim 3, wherein the piston is of a lip type.

5. The pressure regulator of claim 3, wherein the piston is an O-ring piston.

6. The pressure regulator of claim 1, wherein the pressure-generating structure is a coil spring disposed between the pressure-sensing structure and a spring collar.

7. The pressure regulator of claim 6, wherein the side wall of the hollow casing includes a port between the pressure-sensing structure and the spring collar, and the port is capable of releasing fluid from the inflatable object when the pressure inside the object exceeds the desired pressure.

8. The pressure regulator of claim 7, wherein the distance between the port and the pressure-sensing structure is proportional to the maximum pressure allowed for the inflatable object.

9. The pressure regulator of claim 1, wherein the valve system is a Shrader valve.

10. The pressure regulator of claim 1, wherein the valve system is a ball valve.

11. The pressure regulator of claim 1, further includes a reed disposed in the fluid flow path.

12. The pressure regulator of claim 11, wherein the reed comprises two sound-generating pieces; the first piece generates a buzzing sound during inflation; and the second piece generates a different buzzing sound during deflation.

13. The pressure regulator of claim 6, wherein the spring collar is connected to at least one screw which extends outside the side wall of the hollow casing.

14. The pressure regulator of claim 13, wherein the setting for the desired pressure is adjusted by sliding the screw along a longitudinal slot formed in the side wall of the hollow casing.

15. The pressure regulator of claim 13, wherein a bellows is disposed between the spring collar and the fluid outlet.

16. The pressure regulator of claim 1, further includes a component for presetting the desired pressure in the inflatable object.

17. The pressure regulator of claim 1, further includes a pressure indicator disposed in the hollow casing.

18. The pressure regulator of claim 17, wherein the pressure indicator is a marker.

19. The pressure regulator of claim 18, wherein the maker is attached to the outside of the conduit.

20. The pressure regulator of claim 1, further comprising a flow indicator.

21. The pressure regulator of claim 20, wherein the flow indicator is a visual ball display.

22. A product made according to claim 1.

23. The product of claim 22, wherein the product is a tire valve.

24. The product of claim 22, wherein the product is a tire valve extension.

25. The product of claim 22, wherein the product is a flow control device.

26. The product of claim 22, wherein the product is a tire inflating or deflating device.

27. A method of inflating or deflating an inflatable object comprising using the pressure regulator according to claim 1.

28. A method of inflating or deflating an inflatable object, comprising:

obtaining a pressure regulator comprising a pressure-sensing structure, a pressure-generating structure, a fluid conduit, and a valve system inside a hollow casing, the valve system capable of actuating fluid flow to the fluid conduit according to the difference between a desired pressure and the actual pressure inside the inflatable object, and capable of preventing the force produced by the pressure source from transferring to the pressure-sensing structure when the valve system is in close state;

presetting the desired pressure on the regulator to cause the pressure-generating structure to exert a bias force on the pressure-sensing structure;

connecting the pressure regulator to a pressure source and the inflatable object;

effectuating fluid flow from the pressure source to the inflatable object through the fluid conduit if the desired pressure is higher than the initial pressure in the inflatable object; and effectuating fluid release from the inflatable object if the desired pressure is lower than the initial pressure in the inflatable object.

* * * * *